(12) United States Patent
Bani Hani

(10) Patent No.: US 7,925,278 B2
(45) Date of Patent: Apr. 12, 2011

(54) METHOD AND SYSTEM FOR LOCATING A WIRELESS DEVICE IN A WIRELESS COMMUNICATION NETWORK

(75) Inventor: Mohammad S. Bani Hani, Lindenhurst, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 637 days.

(21) Appl. No.: 11/426,744

(22) Filed: Jun. 27, 2006

(65) Prior Publication Data

US 2007/0298761 A1    Dec. 27, 2007

(51) Int. Cl.
*H04W 24/00*    (2009.01)

(52) U.S. Cl. ............... 455/456.6; 455/456.1; 455/456.2; 455/456.3; 455/456.4; 455/456.5

(58) Field of Classification Search ............... 455/404.2, 455/456.1–456.6
See application file for complete search history.

(56) References Cited

U.S. PATENT DOCUMENTS

| | | | |
|---|---|---|---|
| 5,327,144 A | | 7/1994 | Stilp et al. |
| 5,373,531 A | * | 12/1994 | Kawasaki ..................... 375/150 |
| 5,535,278 A | * | 7/1996 | Cahn et al. .................... 380/274 |
| 6,181,944 B1 | * | 1/2001 | Uebayashi et al. ......... 455/456.2 |
| 6,420,999 B1 | * | 7/2002 | Vayanos .................. 342/357.03 |
| 2002/0009199 A1 | * | 1/2002 | Ala-Laurila et al. .......... 380/247 |
| 2005/0030931 A1 | * | 2/2005 | Sung et al. .................... 370/342 |
| 2005/0122936 A1 | * | 6/2005 | Son et al. ...................... 370/331 |
| 2005/0228613 A1 | * | 10/2005 | Fullerton et al. ............. 702/150 |
| 2006/0007935 A1 | * | 1/2006 | Bennett et al. ............. 370/395.5 |
| 2006/0181414 A1 | * | 8/2006 | Bandy et al. ............. 340/539.22 |
| 2007/0132577 A1 | * | 6/2007 | Kolavennu ............. 340/539.13 |

FOREIGN PATENT DOCUMENTS

WO    2005065320 A2    7/2005

* cited by examiner

*Primary Examiner* — Lester Kincaid
*Assistant Examiner* — Nathan Mitchell
(74) *Attorney, Agent, or Firm* — Gary J. Cunningham

(57) ABSTRACT

A method and system for locating a Wireless electronic device (200) in a wireless communication network (100) is provided. The method includes sending a ranging code (504) by the wireless electronic device to a predefined number of base stations. The method further includes replicating (506) the ranging-code by the predefined number of base stations, for calculating the pseudoranges. Moreover, the method includes locating (508) the wireless electronic device, based on calculations of distance, using a ranging-response message sent by the predefined number of base stations to the wireless electronic device.

20 Claims, 11 Drawing Sheets

METHOD AND SYSTEM FOR LOCATING A WIRELESS DEVICE IN A WIRELESS COMMUNICATION NETWORK

FIELD OF THE INVENTION

The present invention relates to the field of wireless networks, and more specifically, to locating a wireless device in a wireless communication network.

BACKGROUND

Wireless communication devices are becoming increasingly important for communication nowadays. Information and data can be transferred in a wireless communication network by using wireless communication devices. The wireless communication network includes one or more wireless communication devices and one or more base stations. A base station is a fixed device that is connected through a wired medium with other base stations. The base station provides wireless connectivity to wireless communication devices. Examples of wireless communication devices include, but are not limited to, a laptop computer, a personal wireless computer, a mobile phone, or a personal digital assistant (PDA). Determining the location of wireless communication devices has become a necessity for various purposes.

The location of a wireless communication device in the wireless communication network can be determined by using either a mobile-based or a server-based method. In the mobile-based method, calculations for determining the location are carried out at the wireless communication device. In the server-based method, calculation for determining the location-are carried out at a location-control server. Determination of the location of the wireless communication device in non-line of sight conditions may not be accurate. Non-line of sight conditions exist when the wireless communication device is not in the direct line of sight of a Global Positioning Satellite (GPS) or a base station. This can be overcome by utilizing the wireless communication network's infrastructure properties. For example, a ranging process can be used for power correction as well as time-synchronization of the wireless communication device with the wireless communication network.

A number of methods exist for determining the location of the wireless communication device. Most of these methods employ a triangulation method, which includes sending a message to three base stations simultaneously. The time taken by the message to reach the three base stations is measured and multiplied by the speed of light, which provides the distance between the wireless communication device and the three base stations. The distance between the wireless communication device and the three base stations is used to determine the location of the wireless communication device.

In one of the existing methods, the location of a wireless communication device in a Wireless Local Area Network (WLAN) is determined by using the triangulation method. This method does not, however, use the existing features of the WLAN to determine the location of the wireless communication device.

Another existing method for locating the wireless communication device in a wireless communication network uses the Time Difference of Arrival (TDOA) and the Frequency Difference of Arrival (FDOA). The distance between the wireless communication device and the three base stations is calculated by multiplying the TDOA with the speed of light. The TDOA is based on measuring the difference in a Time Of Arrival (TOA) of either of a three downlink signals received at the wireless communication device from the three base stations or can be based on the difference in the Time Of Arrival (TOA) of the uplink signals received at the three base stations from the wireless communication device. The difference in the TOA measurements of these signals is directly related to the distance differences between the wireless communication device and the three base stations. The distance differences thus calculated in the TDOA methods are used to compute the location of the wireless communication device. The FDOA is used for calculating the distance between the wireless communication device and the three base stations. The distance is calculated by dividing the speed of light by the FDOA. The FDOA is a frequency of the message received by the base station of the three base stations from the wireless communication device. The method is restricted to locating the wireless communication device, only when the wireless communication device is within the range of at least the three base stations.

In another existing method, the accuracy of locating a wireless communication device in a cellular communication system is determined. In this method, the location is determined by integrating information from an assisted GPS that is embedded in the wireless communication device and the properties of the cellular communication systems. The method is restricted to locating the wireless communication device, which is equipped with the assisted GPS. Further, the method is restricted since the assisted GPS embedded in the wireless communication device and the properties of the cellular communication system cannot be used independently of each other.

BRIEF DESCRIPTION OF THE FIGURES

The preferred embodiments of the invention will hereinafter be described in conjunction with the appended drawings provided to illustrate and not to limit the invention, wherein like designations denote like elements, and in which.

Figure 1:
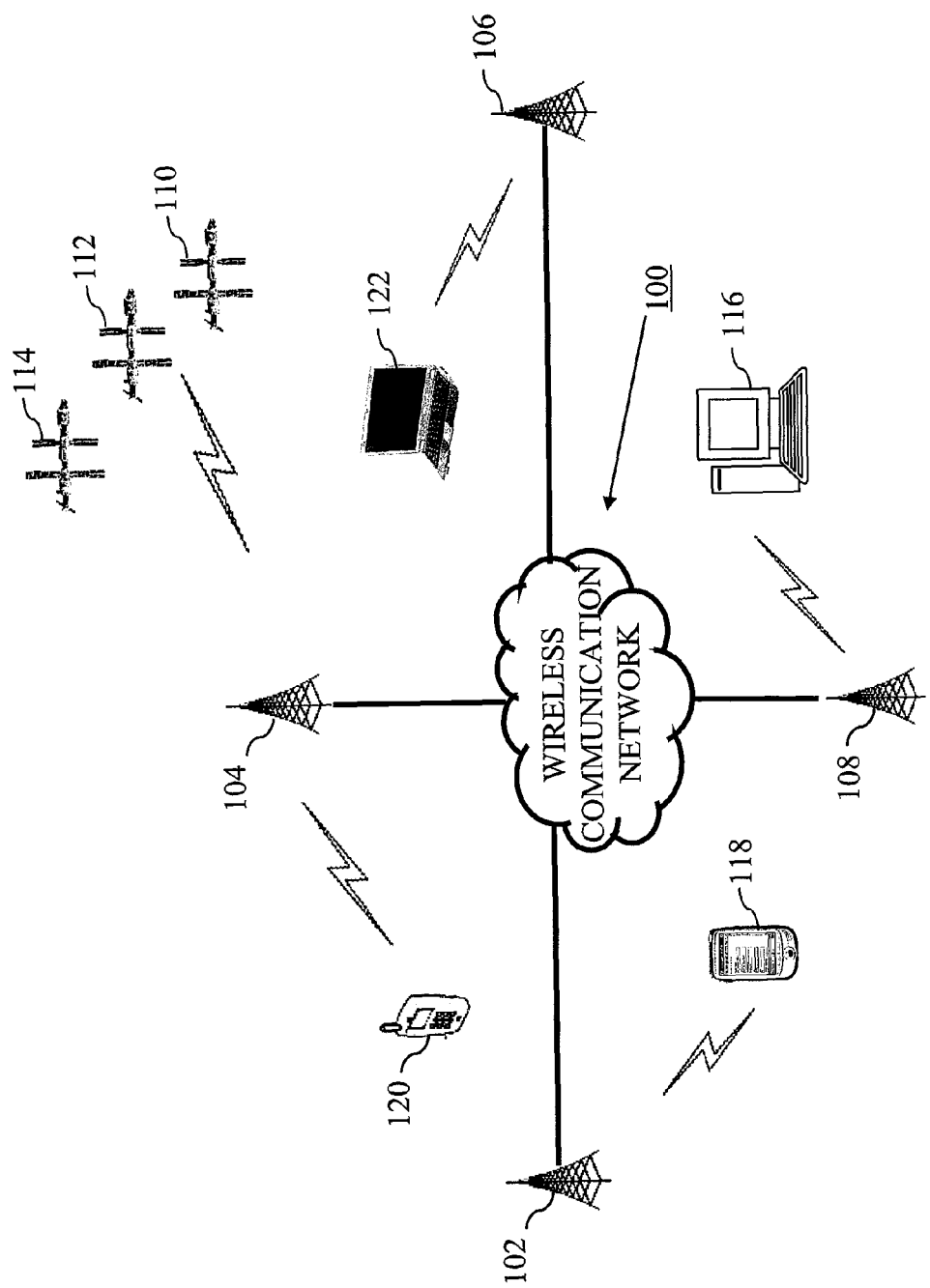
FIG. 1 illustrates a wireless communication network of wireless electronic devices and base stations, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help, to improve an understanding of embodiments of the present invention.

DETAILED DESCRIPTION OF THE FIGURES

Before describing in detail the particular method and system for locating a wireless device in a wireless communication network, in accordance with various embodiments of the present invention, it should be observed that the present invention resides primarily in combinations of method steps and apparatus components related to locating the wireless device in the wireless communication network. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements not expressly listed or inherent to such a process, method, article, or apparatus. An element proceeded by "comprises . . . a" does not, without more constraints, preclude the existence of additional identical elements in the process, method, article or apparatus that comprises the element. The terms "includes" and/or "having", as used herein, are defined as comprising.

A method for locating a wireless electronic device in a wireless communication network is provided. The wireless communication network includes a plurality of base stations. The method includes sending a ranging-code to a predefined number of base stations of the plurality of base stations. The ranging-code is sent by the wireless electronic device. The method also includes replicating the ranging-code by the predefined number of base stations. The ranging-code is used to determine pseudoranges. Further, the method includes locating the wireless electronic device, based on calculations of distances by using a ranging response message. The ranging response message includes a pseudorange sent by one or more base stations of the predefined number of base stations.

A method for locating a wireless electronic device in a Worldwide Interoperability for Microwave Access (WiMAX) network is provided. The WiMAX network includes a plurality of base stations. The method includes sending a ranging-code to a predefined number of base stations of the plurality of base stations. The ranging-code is sent by the wireless electronic device. The method also includes replicating the ranging-code by the predefined number of base stations. The ranging-code is used to determine the pseudoranges. Further, the method includes locating the wireless electronic device, based on calculations of distances by using a ranging response message. The ranging response message includes the pseudorange sent by one or more base stations of the predefined number of base stations.

A method for providing an assisted Global Positioning System (GPS) data by a base station to a wireless electronic device functioning in a wireless communication network is provided. The wireless communication network includes a plurality of base stations and plurality of wireless electronic devices equipped with GPS capabilities. Each base station of the plurality of base stations includes a GPS receiver. The method includes a data message being decoded by the base station. The data message is broadcasted by a wireless electronic device. The method also includes the base station extracting ephemeris, almanac, and GPS time for network-time-synchronization from another data message. Further, the method includes the assisted GPS data being broadcasted by the base station to each wireless electronic device of the plurality of wireless electronic devices within a coverage area of the base station. The assisted GPS data includes network time-synchronization information and the assisted GPS data messages.

A method for providing a differential GPS correction data to a wireless electronic device in a wireless communication network is provided, in accordance with the present invention. The wireless communication network includes a plurality of wireless electronic devices and a plurality of base stations. Each base station of the plurality of base stations includes a Differential Global Positioning System (DGPS) receiver. Further, each wireless electronic device of the plurality of the wireless electronic device include a DGPS receiver. Each base station of the plurality of the base stations has fixed and surveyed location. The method includes measuring a pseudorange with visible GPS satellites by the DGPS receiver of the wireless electronic device. The method also includes measuring pseudoranges with visible GPS satellites by the DGPS receiver of the base station for higher positioning accuracy. The pseudoranges are measured to provide pseudorange correction data to the wireless electronic device and the DGPS receiver. The method further includes broadcasting the differential GPS pseudorange correction data to one or more wireless electronic device of the plurality of wireless electronic devices within the differential correction range of the base station of the plurality of base stations.

A wireless electronic device that is capable of determining its location in a Worldwide Interoperability for Microwave Access (WiMAX) network is provided. The wireless electronic device includes a transmitter that is capable of transmitting a location-ranging request message and a location-ranging-code to at least one base station. The ranging-code is used for determining a pseudorange. The wireless electronic device also includes a receiver that is capable of receiving a ranging-response message from the at least one base station. The response message includes the pseudorange, the location coordinates of the base station, power-correction information, and time-synchronization information. Further, the wireless-access electronic device includes a data-processing unit for computing the location of the wireless electronic device by calculating the distance, using the ranging-response message.

A base station used for locating a wireless electronic device in a Worldwide Interoperability for Microwave Access (WiMAX) network is provided. The base station includes receivers that are capable of receiving ranging-codes from three or more GPS satellites and the wireless electronic device. The base station also includes a transmitter that is capable of transmitting a ranging-response message to the wireless electronic device, in response to the ranging-codes sent by the wireless electronic device. The ranging-response message includes a pseudorange, the location coordinates of the base station, power corrections, and time-synchronization information. Further, the base station includes a synchronization module for providing time-synchronization information pertaining to the base station to the wireless electronic device.

FIG. 1 illustrates a wireless communication network 100 of base stations 102, 104, 106, and 108 and wireless electronic devices 116, 118, 120, and 122. The wireless communication network can be a Code Division Multiple Access (CDMA)

network, a Global System for Mobile Communications (GSM) network, a Universal Mobile Telecommunications System (UMTS) network, or a Worldwide Interoperability for Microwave Access (WiMAX) network. The wireless communication network 100 can be standard-based wireless technologies that provide high-speed Internet connectivity over long distances. In particular, the WiMAX network simultaneously provides Voice over Internet Protocol (VoIP), video streaming, and Internet access. The wireless communication network 100 includes a plurality of base stations. For the purpose of describing the present invention, the wireless communication network 100 is shown to include a first base station 102, a second base station 104, a third base station 106, and a fourth base station 108. The first base station 102, the second base station 104, the third base station 106, and the fourth base station 108 are connected through wired connections. The wireless communication network 100 also includes a constellation of GPS satellites. The constellation of GPS satellites includes a first GPS satellite 110, a second GPS satellite 112 and a third GPS satellite 114. Further, the wireless communication network 100 includes a personal computer 116, a Personal Digital Assistant (PDA) 118, a mobile phone 120, and a laptop computer 122 which are examples of wireless electronic devices. The constellation of GPS satellites can be used to locate the mobile phone 120, the laptop computer 114, the personal computer 116, and the personal digital assistant (PDA) 118 in non-line of sight conditions. Non-line of sight conditions exist in high-rise buildings, narrow streets and canyons due to weak signals from the first GPS satellite 110, the second GPS satellite 112, and the third GPS satellite 114. The first base station 102, the second base station 104, the third base station 106, and the fourth base station 108 are used for providing wireless access to the mobile phone 120, the laptop computer 114, the personal computer 116, and the PDA 118.

Figure 2:
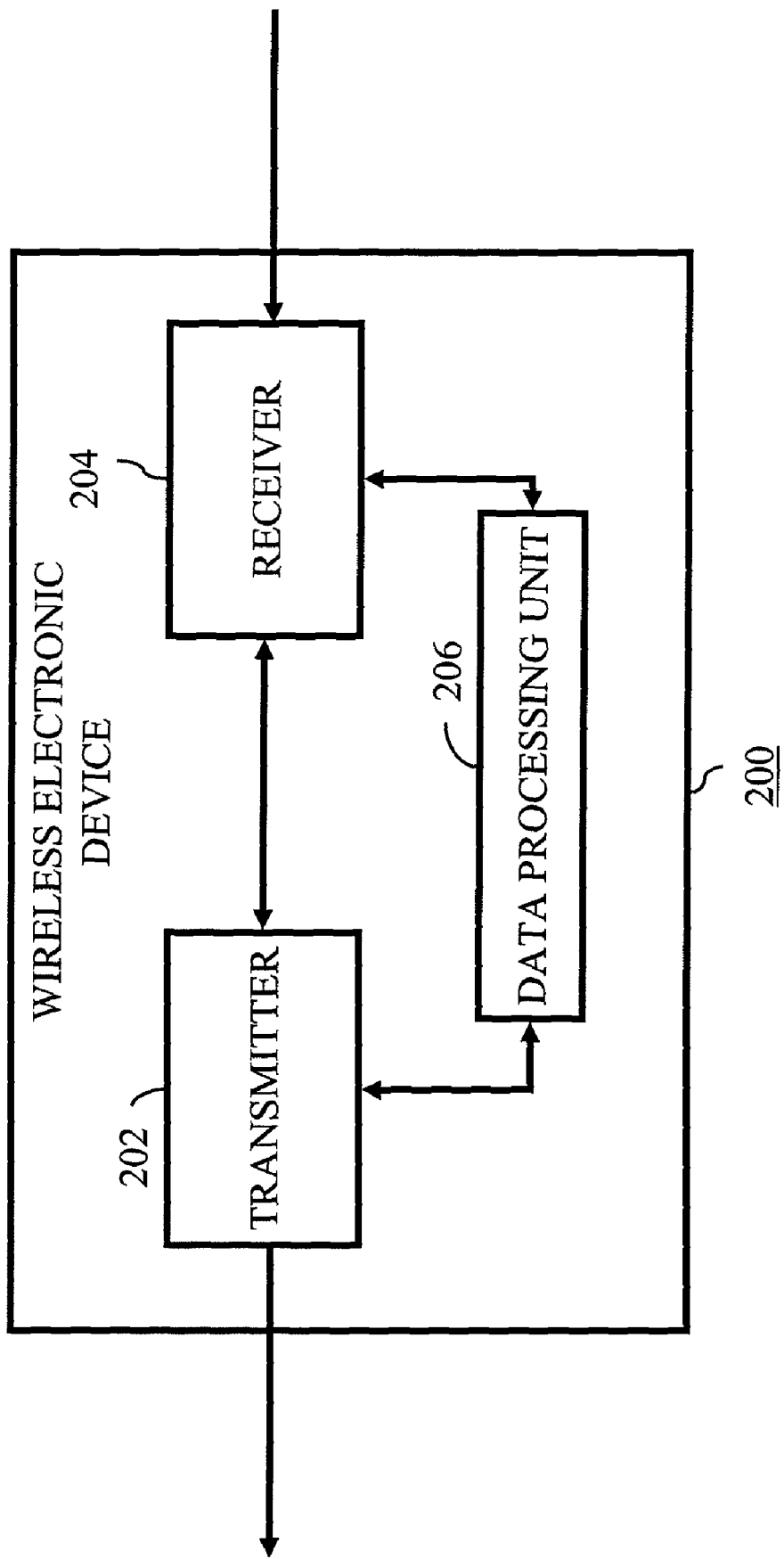
FIG. 2 is a block diagram of a wireless electronic device, in accordance with some embodiments of the present invention.

FIG. 2 illustrates a block diagram of a Wireless Electronic Device 200. The wireless electronic device 200 is capable of determining its location in a wireless communication network 100. The wireless electronic device 200 can be a wireless broadband access electronic device or any other wireless communication device. Examples of the wireless electronic device 200 can be the mobile phone 120, the laptop computer 114, the personal computer 116, and the PDA 118. The wireless electronic device 200 includes a transmitter 202, a radio frequency receiver 204, and a data-processing unit 206. The transmitter 202 is capable of transmitting a ranging-code to one or more base stations. The ranging-code is sent by the wireless electronic device 200 as part of a ranging process. The ranging process is used for time-synchronization and power-control of the wireless electronic device 200 in the wireless communication network 100. The ranging process can be extended to provide pseudoranges, calculated by the plurality of one or more base stations, to the wireless electronic device 200. The radio frequency receiver 204 is capable of receiving a ranging-response message from the one or more base stations. The ranging-response message includes pseudoranges calculated by the wireless electronic device 200. The ranging response message also includes the location coordinates of the one or more base stations, power-correction information, and time-synchronization information. The pseudoranges are used for locating the wireless electronic device 200 in the wireless communication network 100. The pseudorange is the time taken by the ranging-code to reach the first base station 102, the second base station 104, the third base station 106, and the fourth base station 108, multiplied by the speed of light. The output power of the transmitter 202 is adjusted by using the power-correction information received from the first base station 102, the second base station 104, the third base station 106, and the fourth base station 108. The time-synchronization information is used for synchronizing wireless electronic device 200 with the first base station 102, the second base station 104, the third base station 106, and the fourth base station 108.

The data-processing unit 206 is capable of computing the location of the wireless electronic device 200 by using the ranging-response message sent by the first base station 102, the second base station 104, the third base station 106, and the fourth base station 108 to the wireless electronic device 200. The ranging-response message is sent by each base station of the one or more base stations, in response to the ranging-code sent by the wireless electronic device 200 to the first base station 102, the second base station 104, the third base station 106, and the fourth base station 108. The ranging-response message includes the pseudorange, the location coordinates of the first base station 102, the second base station 104, the third base station 106, and the fourth base station 108, power-correction information, and time-synchronization information.

Figure 3:
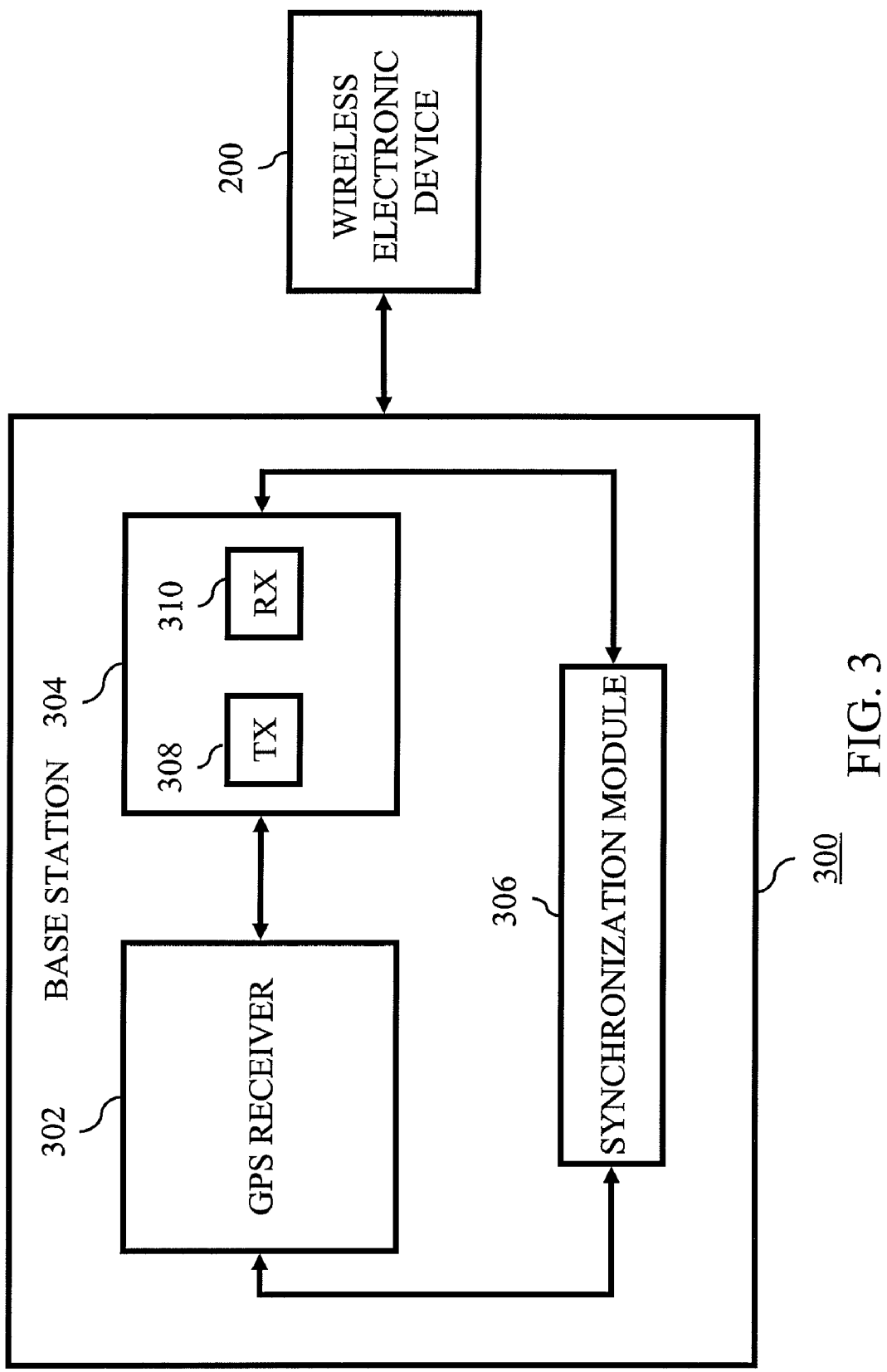
FIG. 3 is a block diagram of a base station communicating with a wireless electronic device, in accordance with some embodiments of the present invention.

FIG. 3 illustrates a block diagram of the base station 300 communicating with the wireless electronic device 200. The base station 300 is functioning in the wireless communication network 100 and is connected with the wireless communication network 100 through wired connections. The base station 300 is used for providing access to the wireless electronic device 200. The base station 300 is also used for locating the wireless electronic device 200 in a wireless communication network 100. The base station 300 includes a GPS radio frequency receiver 302, a radio frequency transceiver 304, and a synchronization module 306. The radio frequency transceiver 304 includes a base station transmitter 308 and a base station radio frequency receiver 310. The base station radio frequency receiver 310 is capable of receiving the ranging-code sent by the wireless electronic device 200 as part of a ranging process. Further, the GPS radio frequency receiver 302 is capable of determining an accurate time reference of the base station 300, as per the Coordinated Universal Time (UTC) standard. The GPS radio frequency receiver 302 updates the accurate time from a UTC server. The accurate time is then sent by the base station 300 to the wireless electronic device 200 for synchronizing the wireless electronic device 200 with the base station 300. Time-synchronization and power-control with the wireless communication network 100 is achieved by the ranging process. Further, the ranging process may be extended to provide pseudoranges calculated by a first base station 102, a second base station 104, a third base station 106, and a fourth base station 108 to the wireless electronic device 200. The base station transmitter 308 is capable of transmitting a ranging-response message to the wireless electronic device 200, in response to the ranging-code sent by the wireless electronic device 200. The ranging-response message includes pseudoranges, location coordinates of the base station 300, power-correction information, and time-synchronization information. The power-correction information is used for adjusting the output power of the transmitter 202 of the wireless electronic device 200, according to the power-correction information received from the base station transmitter 308 of the base station 300. The time-synchronization information is used for time-synchronizing the wireless electronic device 200 with the base station 300. The synchronization module 306 is used for providing time-synchronization information pertaining to the base station 300 to the wireless electronic device 200. The synchronization module 306 is used for synchronizing the clocks of the wireless electronic device 200 and the base station 300, so that the actual time of transmission of the ranging-response message is known to the wireless electronic device 200, and the actual time of transmission of the ranging-code is known to the base station 300.

Figure 4:
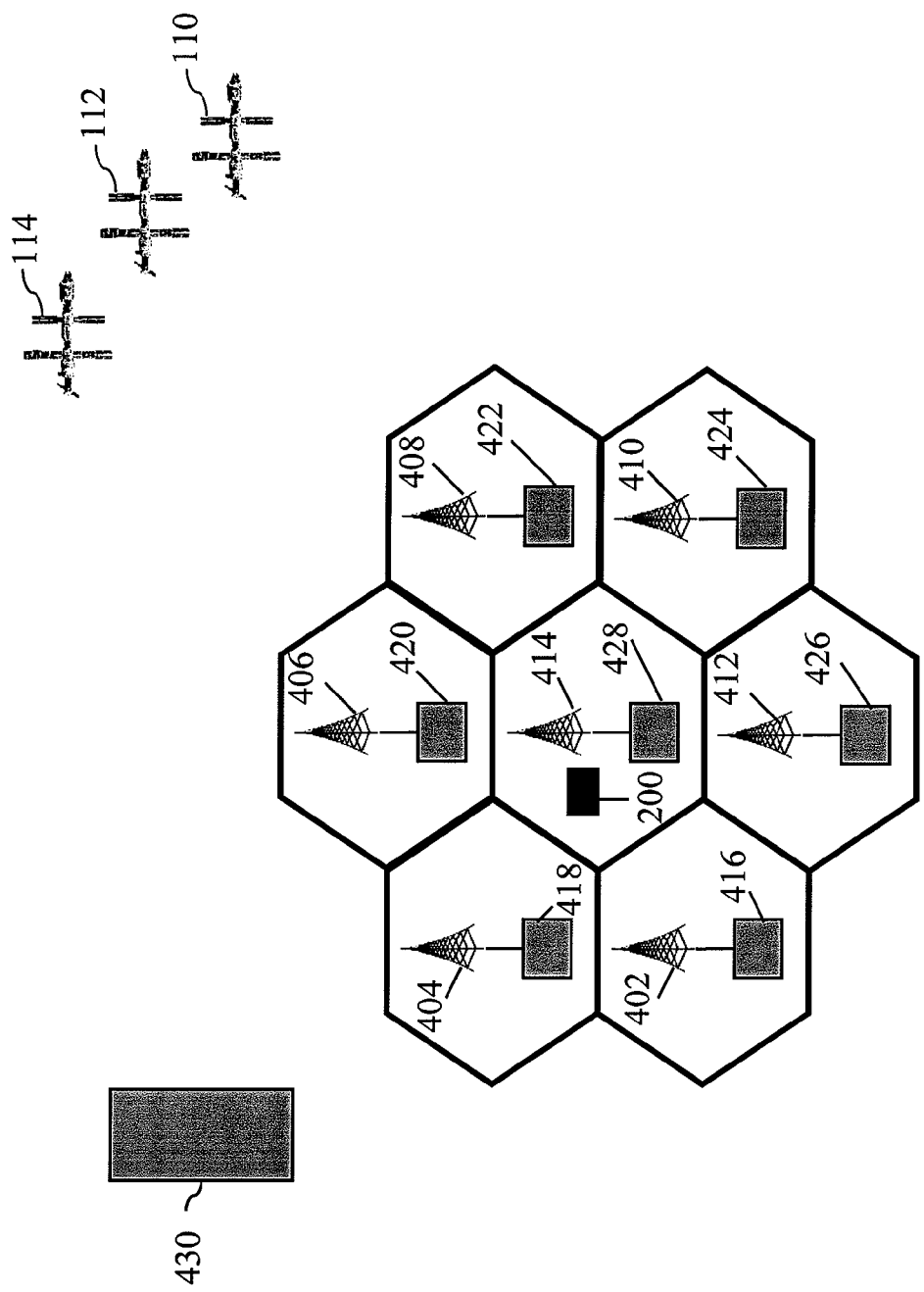
FIG. 4 is a block diagram of a wireless electronic device communicating with two or more base stations for location determination.

FIG. 4 is a block diagram illustrating the communication of wireless electronic device 200 with two or more base stations. The two or more base stations include a first base station 402, a second base station 404, a third base station 406, a fourth base station 408, a fifth base station 410, a sixth base station 412, and a seventh base station 414 for location determination. Further, a constellation of GPS satellites can also be used to locate the wireless electronic device 200. The constellation of GPS satellites includes the first GPS satellite 110, the second GPS satellite 112, and the third GPS satellite 114. Moreover, each of the two or more base stations includes a radio frequency receiver each. Therefore, the first base station 402 includes a first radio frequency receiver 416, the second base station 404 includes a second radio frequency receiver 418, the third base station 406 includes a third radio frequency receiver 420, the fourth base station 408 includes a fourth radio frequency receiver 422, the fifth base station 410 includes a fifth radio frequency receiver 424, the sixth base station 412 includes a sixth radio frequency receiver 426, and the seventh base station 414 includes a seventh radio frequency receiver 428. Furthermore, a location-control server 430 is used for calculating the location of the wireless electronic device 200. For an embodiment of the present invention, the wireless electronic device 200 sends a ranging-code to four base stations of the two or more base stations. For exemplary purposes, let us consider that the wireless electronic device 200 sends the ranging-code to the first base station, 402, the second base station 404, the third base station 406, and the fourth base station 414, for determining the location of the wireless electronic device 200 in three dimensions, these three dimensions being latitude, longitude and altitude. The ranging-code is sent by the wireless electronic device 200 as part of a ranging process. The ranging process is used for time-synchronization and power-control of the wireless electronic device 200 with the wireless communication network 100. The ranging process can be extended to provide pseudoranges calculated by the first base station, 402, the second base station 404, the third base station 406, and the fourth base station 414 to the wireless electronic device 200. The first radio frequency receiver 416, the second radio frequency receiver 418, the third radio frequency receiver 420, and the fourth radio frequency receiver 428 receive the ranging-code from the wireless electronic device 200. The ranging-code sent by the wireless electronic device 200 is selected from a set of CDMA codes. The set of CDMA codes are pseudo-random noise sequences. The pseudo-random noise sequences are generated by using a CDMA network of a feedback loop and a shift register. For an embodiment of the present invention, the shift registers may include one or more Modulo-2 adders and one or more flip-flops. The total number of CDMA codes in a set depends on the number of flip-flops in the shift register. For example, for the shift register with eight flip-flops, the number of CDMA codes generated are $2^8 (=256)$. The first radio frequency receiver 416, the second radio frequency receiver 418, the third radio frequency receiver 420, and the fourth radio frequency receiver 428 receive, decode and generate replicas of the four ranging-codes sent by the wireless electronic device 200. The first radio frequency receiver 416, the second radio frequency receiver 418, the third radio frequency receiver 420, and the fourth radio frequency receiver 428 receive a unique ranging-code selected from the set of CDMA codes. Hence, the first radio frequency receiver 416, the second radio frequency receiver 418, the third radio frequency receiver 420, and the fourth radio frequency receiver 428 are capable of generating replicas of the ranging-codes and thereby extracting time-delay information. The time-delay information is then used to locate the wireless electronic device 200. Further, the first radio frequency receiver 416, the second radio frequency receiver 418, the third radio frequency receiver 420, and the fourth radio frequency receiver 428 calculate pseudoranges of the wireless electronic device 200 from the first base station 402, the second base station 404, the third base station 406, and the fourth base station 414. The position of the wireless electronic device 200 can be calculated by using the following equations.

$$PR1 = \sqrt{(X_{BS1} - X_W)^2 + (Y_{BS1} - Y_W)^2 + (Z_{BS1} - Z_W)^2} + c\Delta t1 \quad (1)$$

$$PR2 = \sqrt{(X_{BS2} - X_W)^2 + (Y_{BS2} - Y_W)^2 + (Z_{BS2} - Z_W)^2} + c\Delta t2 \quad (2)$$

$$PR3 = \sqrt{(X_{BS3} - X_W)^2 + (Y_{BS3} - Y_W)^2 + (Z_{BS3} - Z_W)^2} + c\Delta t3 \quad (3)$$

$$PR4 = \sqrt{(X_{BS4} - X_W)^2 + (Y_{BS4} - Y_W)^2 + (Z_{BS4} - Z_W)^2} + c\Delta t4 \quad (4)$$

Where, PR1 is the pseudorange of the wireless electronic device 200 from the first base station 402. PR1 may be calculated by using $X_{BS1}$, $Y_{BS1}$, and $Z_{BS1}$, which are the location co-ordinates of the first radio frequency receiver 416. Further, $\Delta t1$ is the ranging-code delay measured between the generation of a ranging-code replica at the first radio frequency receiver 416, relative to receiving the ranging-code at the first radio frequency receiver 416. Moreover, c is the speed of the electromagnetic waves. PR2 is the pseudorange of the wireless electronic device 200 from the second base station 404. PR2 may be calculated by using $X_{BS2}$, $Y_{BS2}$, and $Z_{BS2}$, which are location coordinates of the second radio frequency receiver 418. Further, $\Delta t2$ is the ranging-code delay measured between the generation of a ranging-code replica at the second radio frequency receiver 418, relative to receiving the ranging-code at the second radio frequency receiver 418. PR3 is the pseudorange of the wireless electronic device 200 from the third base station 406. PR3 may be calculated by using $X_{BS3}$, $Y_{BS3}$, and $Z_{BS3}$, which are the location co-ordinates of the third radio frequency receiver 420. Further, $\Delta t3$ is the ranging-code delay measured between the generation of a ranging-code replica at the third radio frequency receiver 420, relative to receiving the ranging-code at the third radio frequency receiver 420. PR4 is the pseudorange of the wireless electronic device 200 from the fourth base station 414. PR4 may be calculated by using $X_{BS4}$, $Y_{BS4}$, and $Z_{BS4}$, which are the location co-ordinates of the fourth radio frequency receiver 428. Further, $\Delta t4$ is the ranging-code delay measured between the generation of a ranging-code replica at the fourth radio frequency receiver 428, relative to receiving the ranging-code at the fourth radio frequency receiver 428. The four equations given above can be solved mutually to find the coordinates of the wireless electronic device 200.

For another embodiment of the present invention, the wireless electronic device 200 sends a ranging-code to the first base station 402, the second base station 404, and the third base station 406. The first base station 402, the second base station 404, and the third base station 406 can be used to determine the location of the wireless electronic device 200 in two dimensions. The dimensions may be any two of latitude, longitude or altitude. The first radio frequency receiver 416, the second radio frequency receiver 418, and the third radio frequency receiver 420 receive, decode and generate replicas of the three ranging-codes send by the wireless electronic device 200. The first radio frequency receiver 416, the second radio frequency receiver 418, and the third radio frequency receiver 420 receive a unique ranging-code selected from the set of CDMA codes, so the first radio frequency receiver 416, the second radio frequency receiver 418, and the third radio frequency receiver 420 are capable of generating replicas of the ranging-codes, and hence extract time-delay information. The time-delay information is then used to locate the wireless electronic device 200. The first radio frequency receiver 416, the second radio frequency receiver 418, and the third radio frequency receiver 420 calculate the pseudoranges of the wireless electronic device 200 from the first base station 402, the second base station 404, and the third base station 406. The location of the wireless electronic device 200 can be determined by using equations (1), (2), and (3).

The position of the wireless electronic device 200 can be calculated by using either a mobile-based or a network-based method. In the mobile-based method, the position of the wireless electronic device 200 is calculated at the wireless electronic device 200. In the network-based method, the position of the wireless electronic device 200 is calculated at the location control server 430.

Figure 5:
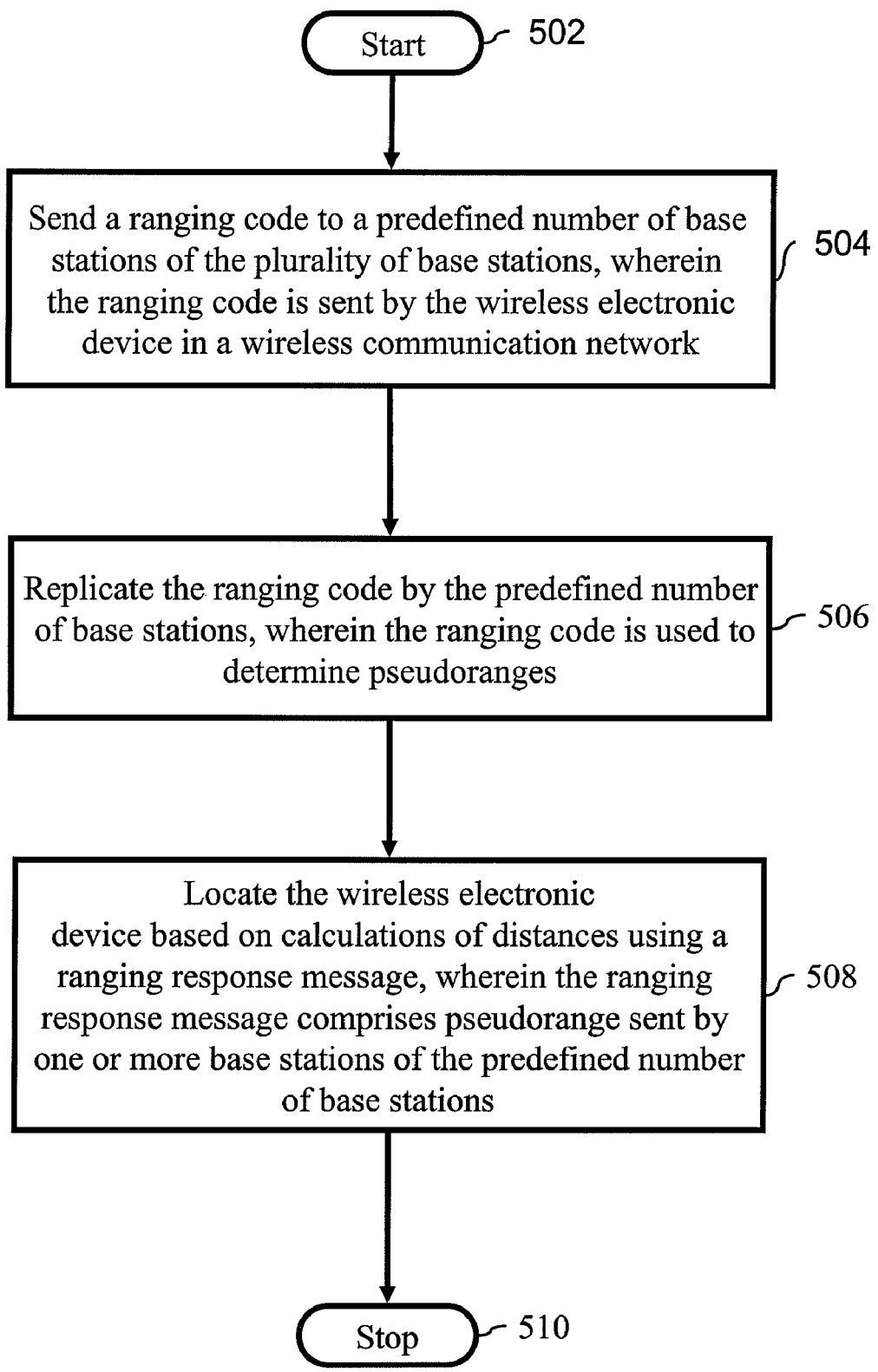
FIG. 5 is a flow diagram for locating a wireless electronic device in the wireless communication network.

FIG. 5 is a flow diagram illustrating a method for locating the wireless electronic device 200 in a wireless communication network 100. The method is initiated at step 502. At step 504, a ranging-code is sent to a predefined number of base stations by the wireless electronic device 200, as part of a ranging process. The ranging process is used for power control information and time-synchronization information with the wireless communication network 100. The predefined number of base stations can be chosen based on the number of dimensions in which the location of the wireless electronic device 200 is to be calculated. For example, when the location of the wireless electronic device 200 is to be determined in three dimensions, the ranging-code is sent to four base stations; whereas when the location of the wireless electronic device 200 is to be determined in two dimensions, the ranging-code can be sent to only three base stations. At step 506, the ranging-code is replicated by the predefined number of base stations for calculating the pseudorange. The pseudoranges are used to locate the wireless electronic device 200. For an embodiment of the present invention, the ranging-code is replicated by the first radio frequency receiver 416, the second radio frequency receiver 418, the third radio frequency receiver 420, and the fourth radio frequency receiver 428. Further, a code delay is measured by the first radio frequency receiver 416, the second radio frequency receiver 418, the third radio frequency receiver 420, and the fourth radio frequency receiver 428. The code delay is the time difference between the generation of the ranging-code replica at the first radio frequency receiver 416, the second radio frequency receiver 418, the third radio frequency receiver 420, and the fourth radio frequency receiver 428, relative to the time at which the first radio frequency receiver 416, the second radio frequency receiver 418, the third radio frequency receiver 420, and the fourth radio frequency receiver 428 receives the ranging-code. The code delay can be used to locate the wireless electronic device 200. At step 508, the location of the wireless electronic device 200 is determined by calculating the distance of the wireless electronic device 200 by using the equations (1), (2), (3) and (4) in conjunction with FIG. 4. The method terminates at step 510.

Figure 6:
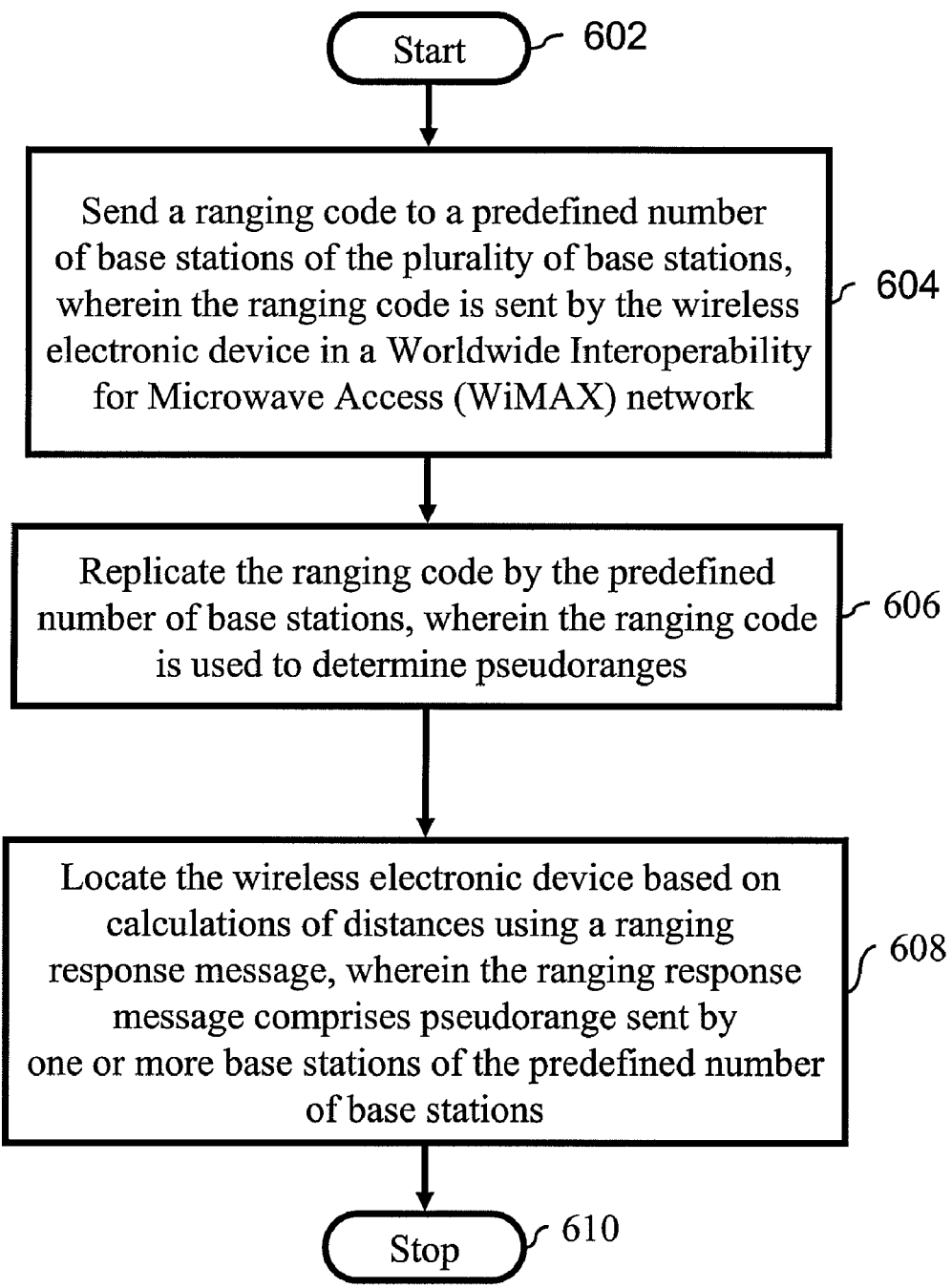
FIG. 6 is a flow diagram for locating a wireless electronic device in a Worldwide Interoperability for Microwave Access (WiMAX) network.

FIG. 6 is a flow diagram illustrating a method for locating the wireless electronic device 200 in a WiMAX network. The method is initiated at step 602. At step 604, a ranging-code is sent to a predefined number of base stations by the wireless electronic device 200 as part of a ranging process. The ranging process is used to obtain power-control information and time-synchronization information in the WiMAX network. The predefined numbers of base stations are chosen based on the number of dimensions in which the location of the wireless electronic device 200 is to be calculated. For example, when the location of the wireless electronic device 200 is to be determined in three dimensions, the ranging-code can be sent to four base stations, whereas, when the location is to be determined in two dimensions, the ranging-code can be sent to three base stations.

Figure 7:
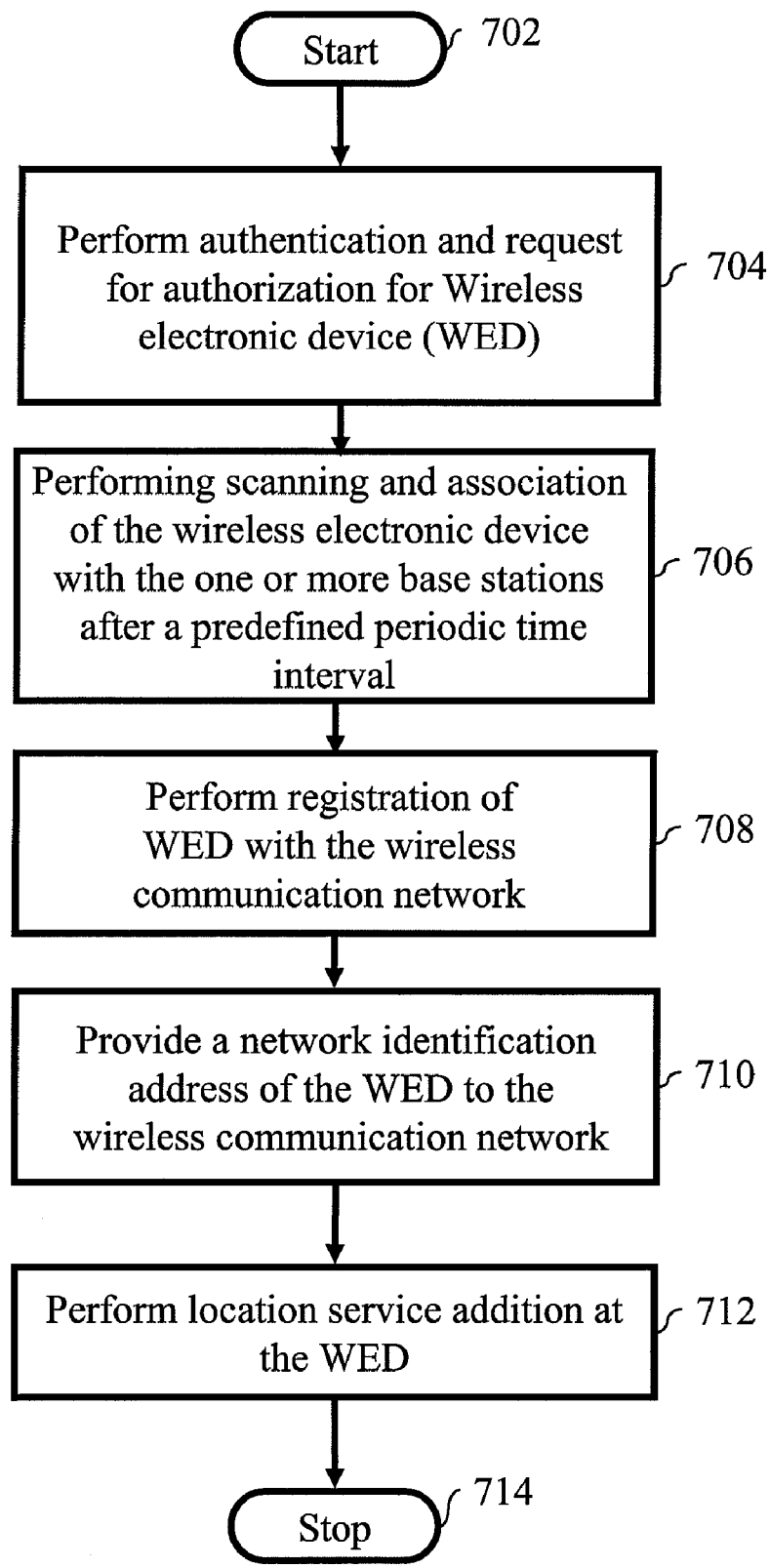
FIG. 7 is a flow diagram illustrating a method for registering and authenticating a wireless electronic device with the wireless communication network.

At step 606, the ranging-code is replicated by the predefined number of base stations for calculating pseudoranges. Further, the pseudoranges are used for locating the wireless electronic device 200. The ranging-code is replicated by the first radio frequency receiver 416, the second radio frequency receiver 418, the third radio frequency receiver 420, and the fourth radio frequency receiver 428. Further, a code delay is measured by the first radio frequency receiver 416, the second radio frequency receiver 418, the third radio frequency receiver 420, and the fourth radio frequency receiver 428. The code delay is the time difference between the generation of the ranging-code replica at the first radio frequency receiver 416, the second radio frequency receiver 418, the third radio frequency receiver 420, and the fourth radio frequency receiver 428, relative to the time at which the first radio frequency receiver 416, the second radio frequency receiver 418, the third radio frequency receiver 420, and the fourth radio frequency receiver 428 receives the ranging-code. The code delay is used to locate the wireless electronic device 200. At step 608, the location of the wireless electronic device 200 is determined by the using the equations (1), (2), (3) (4), as described earlier. For an embodiment of the present invention, the first base station 402, the second base station 404, the third base station 406 and the fourth base station 408 can be used to determine the wireless electronic device 200 position and position errors. The method terminates at step 610. FIG. 7 is a flow diagram illustrating a method for registering and authenticating the wireless electronic device 200 with the wireless communication network 100. The method is initiated at step 702. At step 704, the wireless electronic device 200 performs authentication and request for authorization with the wireless communication network 100 by the ranging process at the wireless electronic device 200. At step 706, a scanning is performed and the wireless electronic device 200 is associated with the one or more base stations after a predefined periodic time interval. At step 708, the wireless electronic device 200 performs registration with the wireless communication network 100, the registration includes providing a network identification address of the wireless electronic device 200 to the wireless communication network 100. The network identification address of the wireless electronic device 200 can be used for mapping a physical location to the location of the wireless electronic device 200. At step 710, the wireless electronic device 200 performs Internet Protocol (IP) connectivity with a Dynamic Host Configuration Protocol (DHCP) server by sending a Media Access Control (MAC) layer message to the wireless communication network 100. The DHCP server is used for assigning an IP address to the wireless electronic device 200. The IP address of the wireless electronic device 200, along with a Base Station Identification (BS-ID) of at least one base station, can be used to locate the wireless electronic device 200. The BS-ID is a 48-bit number that uniquely identifies a base station serving the wireless electronic device 200. For example, the base station 414 serves the wireless electronic device 200. The wireless electronic device 200 can be located by mapping the BS-ID of the base station 414 to the physical location of the wireless electronic device 200. Further, the DHCP server can be used for providing the current local Time of Day (TOD) to the wireless electronic device 200, for synchronizing the wireless electronic device 200 with the wireless communication network 100. The MAC layer is the connection-oriented layer for providing end-to-end connectivity in a wireless communication network 100. At step 712, the wireless electronic device 200 performs Location Service Addition (LSA). Examples of LSA can be tracking and navigation applications, and Enhanced 911 (E911). E911 is a service that helps the authorities identify the location of a caller when he/she calls on the emergency number 911. E911 service requires reporting the location of a cell phone caller when a call is made to the emergency number from the cell phone. The method terminates at step 714.

Figure 8:
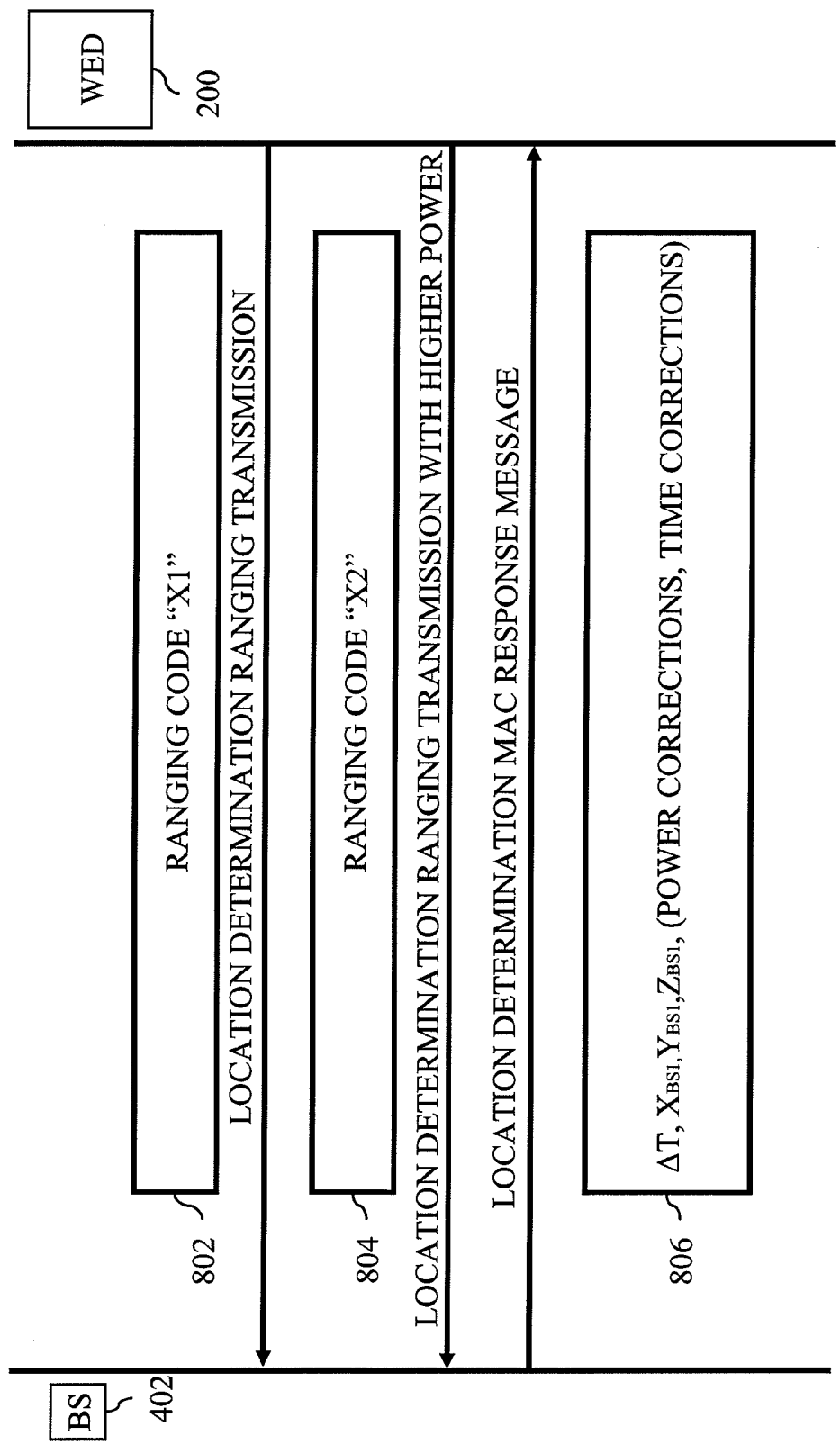
FIG. 8 is a call-flow diagram illustrating an exchange of messages between a wireless electronic device and a base station.

FIG. 8 is a call-flow diagram illustrating the exchange of messages between the wireless electronic device 200 and at least the one base station. For the purpose of this description, let us consider the first base station 402 as the at least one base station. The wireless electronic device 200 sends a ranging-code message 802 to the first base station 402. The ranging-code message 802 is sent as part of the ranging process for determining the location of the wireless electronic device 200. The wireless electronic device 200 again transmits the ranging-code message 804 to the base station 402 when a response message is not received at the wireless electronic device 200 from the base station 402. The ranging-code message 804 transmitted to the first base station 402 has twice the power of the ranging-code message 802. The ranging-code message 802 and the ranging-code message 804 are part of a ranging process used for time-synchronization and power-control of the wireless electronic device 200 with the wireless communication network 100. The ranging process can be extended to provide location coordinates of the first base station 402 to the wireless electronic device 200. The first base station 402 sends a location-determination Media Access Control (MAC) response message 806 to the wireless electronic device 200, in response to the ranging-code message 802 or 804. The location-determination MAC response message 806 includes a code delay, location coordinates of the first base station 402, power correction information, and time-synchronization information. The code delay is the ranging-code delay measured between the generation of a ranging-code replica at the first radio frequency receiver 416 of the first base station 402, relative to receiving the ranging-code at the first radio frequency receiver 416 of the first base station 402. The power-correction information is used for adjusting the output power of a transmitter of the wireless electronic device 200, according to the power-correction information received from a transmitter of first base station 402. The time-synchronization information is used to synchronize wireless electronic device 200 with the first base station 402.

Figure 9:
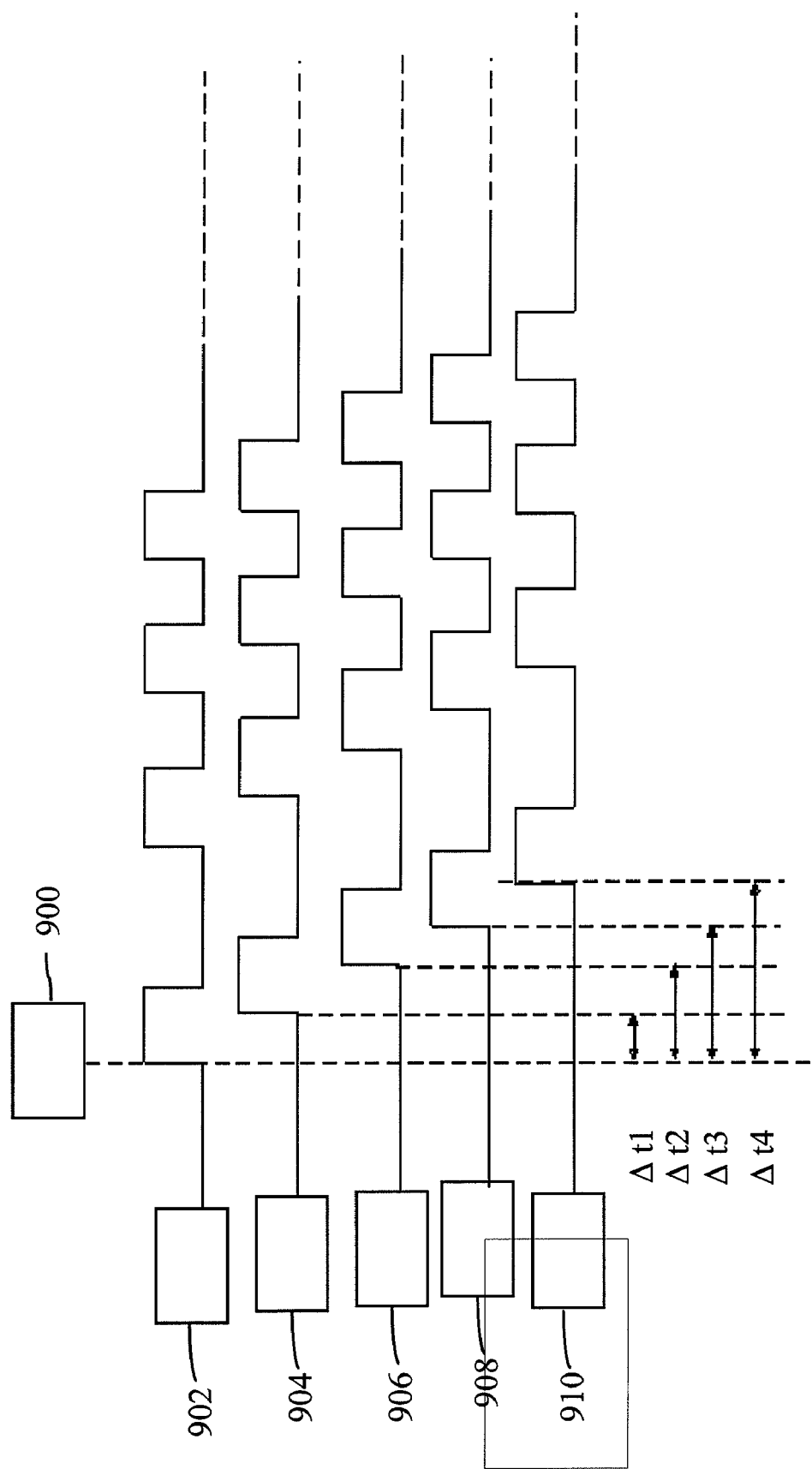
FIG. 9 illustrates a timing diagram of the present invention, depicting the calculation of a time-delay information.

FIG. 9 illustrates a timing diagram depicting the calculation of time-delay information. The time-delay information is measured as the time taken for the generation of the ranging-code replica at the first radio frequency receiver 416, the second radio frequency receiver 418, the third radio frequency receiver 420, and the fourth radio frequency receiver 428, after the ranging-code is received at the first radio frequency receiver 416, the second radio frequency receiver 418, the third radio frequency receiver 420, and the fourth radio frequency receiver 428. A box 900 depicts the Time of Transmission (TOT) of the ranging-code to the first base station 402, the second base station 404, the third base station 406, and the fourth base station 414. A box 902 depicts the time at which the first base station 402, the second base station 404, the third base station 406, and the fourth base station 414 generate replicas of the ranging-code. A box 904 depicts the time at which the ranging-code is received by the first base station 402. A box 906 depicts the time at which the ranging-code is received by the second base station 404. A box 908 depicts the time at which the ranging-code is received by the third base station 406. A box 910 depicts the time at which the ranging-code is received by the fourth base station 414. At time 900, the TOT of the ranging-code is communicated to the first base station 402, the second base station 404, the third base station 406, and the fourth base station 414. At time 902, the first base station 402, the second base station 404, the third base station 406, and the fourth base station 414 generate the replicas of the ranging-code. At time 904, the ranging-code is received by the first base station 402. At time 906, the ranging-code is received by the second base station 404. At time 908, the ranging-code is received by the third base station 406. At time 910, the ranging-code is received by the fourth base station 414. Based on the timing diagram, the time taken by the ranging-code message to reach the first base station 402, the second base station 404, the third base station 406, and the fourth base station 414 is calculated. Further, the time taken by the ranging-code message to reach the first base station 402, the second base station 404, the third base station 406, and the fourth base station 414 is used for determining the pseudoranges. For an embodiment of the present invention, $\Delta t1$ is the ranging-code delay measured between the generation of a ranging-code replica at the first radio frequency receiver 416 of the first base station 402, relative to receiving the ranging-code at the first radio frequency receiver 416. $\Delta t2$ is the ranging-code delay measured between the generation of a ranging-code replica at the second radio frequency receiver 418 of the second base station 404, relative to receiving the ranging-code at the second radio frequency receiver 418. $\Delta t3$ is the ranging-code delay measured between the generation of a ranging-code replica at the third radio frequency receiver 420 of the third base station 406, relative to receiving the ranging-code at the third radio frequency receiver 420. $\Delta t4$ is the ranging-code delay measured between the generation of a ranging-code replica at the fourth radio frequency receiver 428 of the fourth base station 414, relative to receiving the ranging-code at the fourth radio frequency receiver 428. The ranging-code delays $\Delta t1$, $\Delta t2$, $\Delta t3$, and $\Delta t4$ are used for calculating pseudoranges PR1, PR2, PR3 and PR4 by using the equations (1), (2), (3), and (4), as described earlier in conjunction with FIG. 4. The pseudoranges PR1, PR2, PR3 and PR4 are used to locate the wireless electronic device 200.

Figure 10:
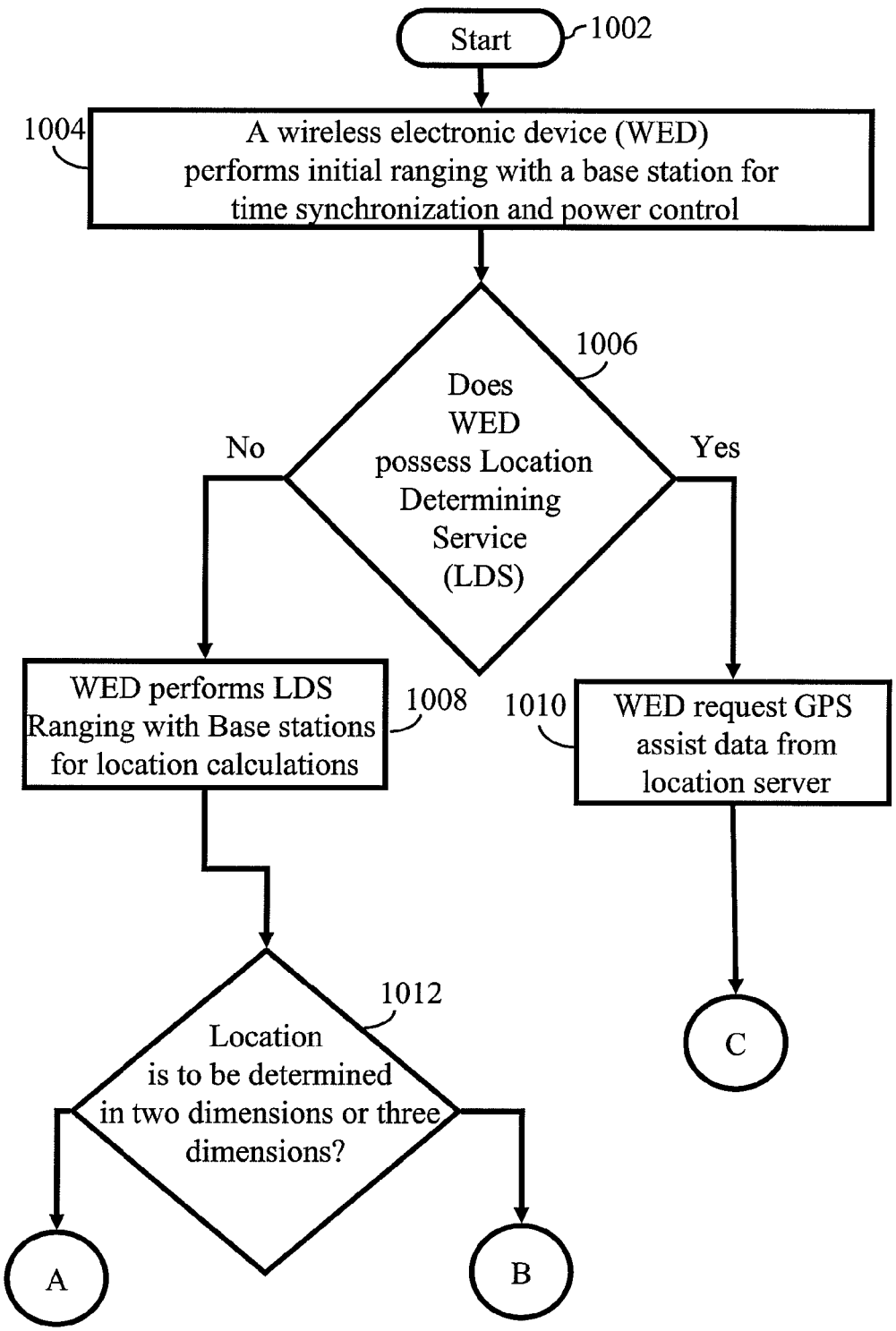
FIGS. 10 and 11 illustrate a flow diagram depicting a method for location determination of a wireless electronic device in the wireless communication network by using a Location Determining Service (LDS).
Figure 11:
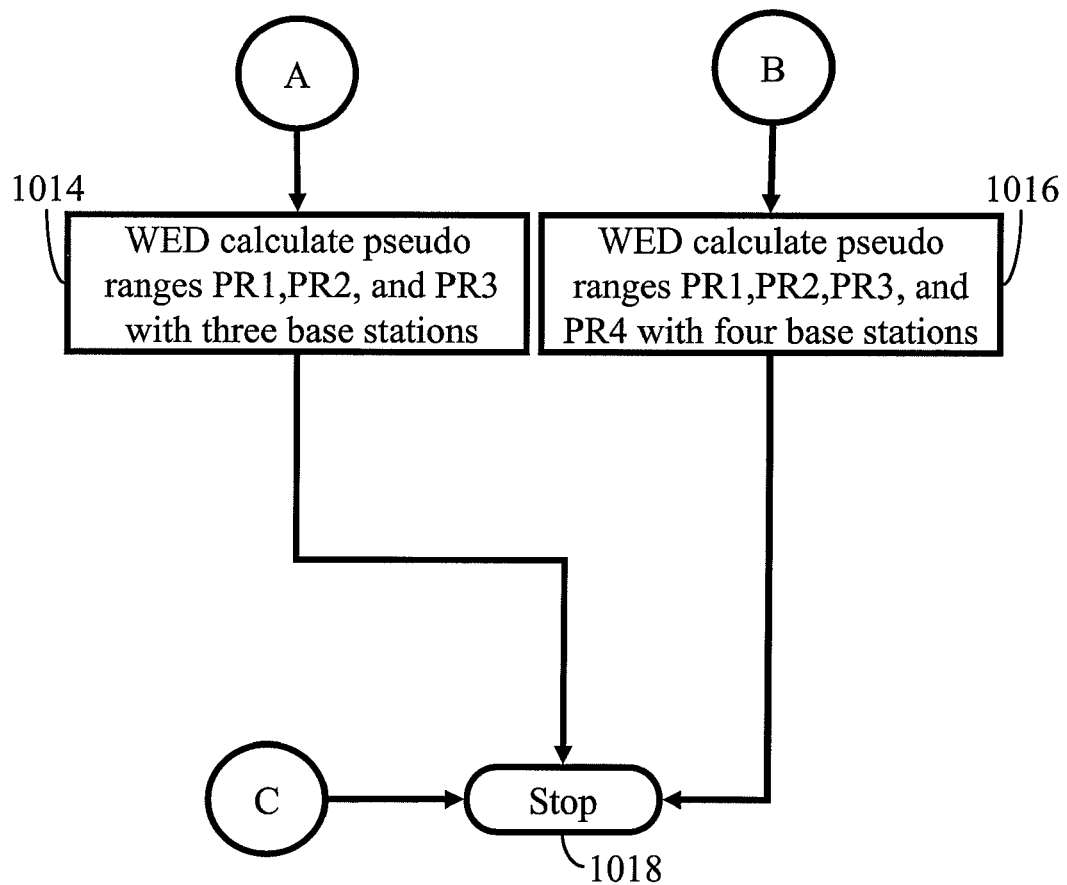

FIGS. 10 and 11 illustrate a flow diagram illustrating a method for location determination of the wireless electronic device 200 in a wireless communication network 100 by using a Location Determining Service (LDS). The LDS is used for providing location determination and navigation and tracking applications for the wireless electronic device 200. The method is initiated at step 1002. At step 1004, the wireless electronic device 200 performs a ranging process with the base station 402 for power-control information and time-synchronization information. At step 1006, a check is carried out whether the wireless electronic device 200 has LDS capability. An example of the LDS capability can be the capability for determining the location of the wireless electronic device 200 by using GPS. If the wireless electronic device 200 does not have LDS capability, then the wireless electronic device 200 performs the LDS-ranging process with base stations at step 1008. If the wireless electronic device 200 has LDS capability such as GPS, then the wireless electronic device 200 makes a request for assisted GPS data from the location control server 430 at step 1010. For an embodiment of the present invention, the assisted GPS data can be obtained by the wireless electronic device 200 sending a unicast assist Connection Identification (CID) to the first base station 402. The first base station 402 sends assisted GPS data to the wireless electronic device 200. The assisted GPS data include ephemeris information, almanac information, approximate reference position, reference time, satellite clock correction parameters, and propagation delay parameters. The ephemeris/almanac information includes Keplerian orbital and navigation parameters to extract positions of visible GPS satellites, for example the first GPS satellite 110, the second GPS satellite 112, and the third GPS satellite 114 can be used to determine the location of the wireless electronic device 200. The first base station 402 may be used as a monitoring station for locating the wireless electronic device 200, without any errors, by utilizing the GPS radio frequency receiver 302 to decode ephemeris information, the almanac information, the, approximate reference position, the reference time, the satellite clock correction parameters, and the propagation delay parameters. At step 1012, it is determined whether the location will be determined in two dimensions or three. If the location of the wireless electronic device 200 is to be determined in two dimensions, then the wireless electronic device 200 calculates pseudoranges PR1, PR2, and PR3 with the first base station 402, the second base station 404, and the third base station 406, using the equations (1), (2), and (3) described in conjunction with FIG. 4, at step 1014. If the location of the wireless electronic device 200 is to be determined in three dimensions, then at step 1016, the wireless electronic device 200 calculates pseudoranges PR1, PR2, PR3, and PR4 with the first base station 402, the second base station 404, the third base station 406, and the fourth base station 414, using the equations (1), (2), (3), and (4) described in conjunction with FIG. 4. Further, the pseudoranges are used to determine the location of the wireless electronic device 200.

For an embodiment of the present invention, the location of the wireless electronic device 200 can be computed in the wireless communication network 100, by using an assisted GPS data. The assisted GPS data includes GPS psuedoranges and a doppler data provided by a GPS receiver of the wireless electronic device 200 equipped with LDS capabilities. The doppler data is used for tracking a GPS signal by a GPS receiver. For example the seventh base station 414 has a GPS receiver. The wireless electronic device 200 receives the assisted GPS data from its anchor base station. Let us consider that the anchor base station is the seventh base station 414 of the wireless communication network 100. For receiving the assisted GPS data, the seventh base station includes a seventh radio frequency receiver 428. An encoded data message is broadcasted by the wireless electronic device 200 to the seventh base station 414 as part of the location ranging process. The seventh base station 414 broadcasts an assisted GPS data to the wireless electronic device 200. The assisted GPS data includes visible satellite Identification (ID), a doppler data, a reference time, and a code delay. The wireless electronic device 200 computes the satellites psuedoranges and measures code delay, Doppler data. Further. the wireless electronic device 200 broadcasts the satellite pseudoranges back to the seventh base station 414 in an encoded data message response. The encoded data message is decoded at the seventh base station 414. For an embodiment of the present invention, decoding the data message includes extracting the computed GPS psuedoranges, time delay, code delay, and doppler data of the first GPS satellite 110, and/or the second GPS satellite 112 and/or the third GPS satellite 114 of the constellation of GPS satellites that are visible to wireless electronic device 200. The computed GPS psuedoranges, time delay, code delay, and doppler data of the first GPS satellite 110, and/or of the second GPS satellite 112 and/or of the third GPS satellite 114 are sent to the location and control server 430 to compute the position of the wireless electronic device 200. Further, the location and control server 430 broadcasts the location of the wireless electronic device 200 to the wireless electronic device 200.

The method and system for locating the wireless device in a wireless communication network offers various advantages. The invention uses existing wireless communication network infrastructure to locate the wireless electronic device. The invention takes into account ranging-code delays while locating the wireless electronic device. The location of the wireless electronic device can be determined accurately by employing the method and system described herein. According to some embodiments of the present invention, the wireless communication network infrastructure and the GPS can be used simultaneously to locate the wireless electronic device. In such embodiments, the wireless-access device can be located even with non-line of sight conditions, high-rise buildings and remote areas. In another embodiment of the present invention, the network-identification address of the wireless-access device is used to locate the wireless-access device. Therefore, the location of the wireless-access device can be determined even without using the network infrastructure. The present invention can be used for locating a mobile phone, a laptop, a personal computer or PDA, etc.

It will be appreciated that the method and system for locating a wireless device described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method for locating a wireless device in a wireless communication network. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for locating a wireless electronic device, the wireless electronic device functioning in a wireless communication network, the wireless communication network comprising a plurality of base stations and a plurality of wireless electronic devices, the method comprising:
   decoding a ranging-code by each of the plurality of base stations, wherein the ranging-code is broadcasted by the plurality of wireless electronic devices;
   generating a ranging-code replica by the predefined number of base stations;
   measuring a code delay at each of the plurality of base stations, wherein the code delay is a time difference between generating the ranging code replica at each of the plurality of base stations relative to the time at which each of the plurality of base stations receives the ranging-code;
   calculating a pseudorange at each of the plurality of base stations using the measured code delay; and
   broadcasting the calculated pseudorange by each of the plurality of base stations to each wireless electronic device of the plurality of wireless electronic devices.

2. The method as recited in claim 1, wherein the plurality of base stations are four or more.

3. The method as recited in claim 1, wherein the calculated pseudorange comprises measured pseudoranges by base stations, location coordinates of the one or more base stations of the plurality of base stations, power corrections, time-synchronization information and GPS time transfer information.

4. The method as recited in claim 1, wherein the ranging-code comprises Media Access Control (MAC) address of the wireless electronic device.

5. The method as recited in claim 1, further comprising:
   performing authentication and request of authorization by the wireless electronic device with the wireless communication network;
   registering the wireless electronic device with the wireless communication network, wherein registering comprises providing network identification address of the wireless electronic device to the wireless communication network; and
   connecting the wireless electronic device to a Dynamic Host Configuration Protocol (DHCP) server which provides a Base Station Identification number (BS-ID) and current local Time of Day (TOD).

6. The method as recited in claim 5 further comprising locating the wireless access electronic device using the BS-ID of the predefined number of base stations.

7. The method as recited in claim 1, wherein at least one of the plurality of base stations is used for calculating position and positioning errors.

8. The method as recited in claim 1, wherein each base station of the plurality of base stations comprises Global positioning System (GPS) radio frequency receiver.

9. The method as recited in claim 8, wherein the GPS receiver is capable of determining accurate time as per the Coordinated Universal Time (UTC) standards and each base station of the plurality of base stations is capable of transferring GPS time to the wireless electronic device for fine time-synchronization.

10. The method as recited in claim 1, wherein a minimum of the predefined minimum numbers of base stations of the plurality of base stations are two.

11. A method for locating a wireless electronic device, the wireless electronic device functioning in a Worldwide Interoperability for Microwave Access (WiMAX) network, the WiMAX network comprising a plurality of base stations and a plurality of wireless electronic devices, the method comprising:
   decoding a ranging-code by each of the plurality of base stations, wherein the ranging-code is broadcasted by the plurality of wireless electronic devices;
   generating a ranging-code replica by each of the plurality of base stations;
   measuring a code delay at each of the plurality of base stations, wherein the code delay is a time difference between generating the ranging code replica at each of the plurality of base stations relative to the time at which each of the plurality of base stations receives the ranging-code;
   calculating a pseudorange at each of the plurality of base stations using the measured code delay; and
   broadcasting the calculated pseudorange by each of the plurality of base stations to each wireless electronic device of the plurality of wireless electronic devices.

12. The method as recited in claim 11, wherein the plurality of base stations are three or more.

13. The method as recited in claim 11, wherein the calculated pseudorange further comprises location coordinates of the one or more base stations of the plurality of base stations, power corrections and time-synchronization information.

14. The method as recited in claim 11, further comprising:
   performing authentication and request of authorization by the wireless electronic device with the wireless communication network;
   performing scanning and association of the wireless electronic device with the one or more base stations after a predefined periodic time interval;
   registering the wireless electronic device with, the Worldwide Interoperability for Microwave Access (WiMAX) network, wherein registering comprises providing network identification address of the wireless electronic device to the WiMAX network; and
   connecting the wireless electronic device to a Dynamic Host Configuration Protocol (DHCP) server which provides a current Local Time of Day (TOD).

15. The method as recited in claim 14, further comprising locating the wireless electronic device using the BS-ID of the predefined number of base stations.

16. The method as recited in claim 11, wherein at least one of the plurality of base stations is further used for calculating the wireless electronic device position and positioning errors.

17. The method as recited in claim 11, wherein each base station of the plurality of base stations comprises Global positioning System (GPS) receiver.

18. The method as recited in claim 17, wherein the GPS receiver is capable of determining accurate time as per the UTC time standards and each base station of the plurality of base stations is capable of transferring GPS time to the wireless electronic device for fine time-synchronization.

19. The method as recited in claim 17, wherein the plurality of base stations are a minimum of two.

20. A method for providing a differential GPS correction data to a wireless electronic device in a wireless communication network, the wireless communication network comprising a plurality of wireless electronic devices and a plurality of base stations, wherein each of the plurality of wireless electronic devices and each of the plurality of base stations comprising a Differential Global Positioning System (DGPS)

receiver, each base station of the plurality of the base stations has fixed and surveyed location, the method comprising:

measuring pseudoranges with visible GPS satellites by the DGPS receiver of the wireless electronic device;

measuring pseudoranges with visible GPS satellites by the DGPS receiver of the base station for higher positioning accuracy, wherein the pseudoranges are measured using a ranging-code replica generated at the base station to provide pseudorange correction data to the wireless electronic device and the DGPS receiver; and broadcasting the differential GPS pseudorange correction data to one or more wireless electronic device of the plurality of wireless electronic devices within a differential correction range of the base station of the plurality of the base stations.

* * * * *